Jan. 7, 1964 R. HELL ETAL 3,117,182

FACSIMILE TRANSMITTER

Filed Sept. 12, 1961 3 Sheets-Sheet 1

Jan. 7, 1964 R. HELL ETAL 3,117,182

FACSIMILE TRANSMITTER

Filed Sept. 12, 1961 3 Sheets-Sheet 2

Jan. 7, 1964 R. HELL ETAL 3,117,182

FACSIMILE TRANSMITTER

Filed Sept. 12, 1961 3 Sheets-Sheet 3

United States Patent Office 3,117,182
Patented Jan. 7, 1964

3,117,182
FACSIMILE TRANSMITTER
Rudolf Hell, Kiel, and Gerhard Graefe, Monkeberg, near Kiel, Germany, assignors to Dr.-Ing. Rudolf Hell Kommanditgesellschaft, Kiel, Germany, a German company
Filed Sept. 12, 1961, Ser. No. 137,674
5 Claims. (Cl. 178—7.1)

This invention is concerned with a facsimile transmitter for photoelectrically scanning and electrically transmitting handwritten information appearing upon a tape or strip-like carrier.

It is in large organizations such as public institutions, banks, boards of trade, insurance companies as well as in industrial and trade establishments, customary and necessary to occasionally transmit to individual departments, for inter-office use, in as simple and inexpensive manner as possible, relatively short handwritten and signed communications or directions, or to exchange communications, which is to be done as far as possible over internal lines. The use of messengers, pneumatic systems, Morse devices, teleprinters, drum-facsimile apparatus, television transmitters and the like is to be avoided as being either too time consuming or too costly or too difficult so far as operation is concerned, or because of the impossibility of effecting transmission of copies which correspond for the intended purpose faithfully to the original versions.

A facsimile transmitter has become known in this connection whereby the text to be transmitted is written with typewritter in single line fashion upon a paper strip or tape, which is subsequently scanned, by means of a rotating mirror prism and a photocell, transverse to the longitudinal extent of the lines. The image impulses thereby obtained are modulated on a carrier frequency voltage and transmitted as amplified alternating current impulses of invariably constant amplitude, thus avoiding difficulties which appear in the amplification of direct voltages. In the receiver, which is substantially similar to a known teleprinter machine, the image impulses, after demodulation thereof, control the motion of a printing bar. The printing system comprises a helically extending edge which is provided elevated (in relief) upon the circumference of a cylinder and continuously inked by an ink soaked felt roller. The recording tape is transported for motion between the helical edge which rotates about the cylinder axis and the electromagnetically actuated printing bar which is arranged parallel to the cylinder axis, that is, perpendicularly to the recording tape. Responsive to each received image impulse, the printing bar hits the recording tape against the helical edge, thereby causing the printing of an image or picture dot at the level of the crossing point between the helical edge and the printing bar.

This machine has many advantages but also the drawback that the rotating mirror prism, serving for the optical scanning, which is ground from a single piece, occasions owing to its considerable production expenses increased manufacturing costs, while the use of a less expensive rotating mirror wheel renders expensive and time consuming the adjustment of the mirror which is from time to time required.

Another disadvantage of the noted machine resides in the need for special devices for producing the carrier frequency. The carrier must be produced, for example, by means of an oscillator, or it must be contained in the scanning light, which would require either that the light source as such has a periodically variable brightness, that is, that it would have to be produced by a periodically firing gas discharge lamp, or that the constant scanning light would have to be modulated before impacting the picture copy, which could be effected by a diaphragm which is variable as to its cross section, or by a rotating perforated disk (a so-called light chopper), or by a rotary swinging mirror, or by a Kerr cell. All such control devices would have to be actuated by alternating voltage which would have to be obtained from a special frequency generator or from the commercial network.

Since all these possibilities for the generation of the carrier frequency require an additional expenditure, it would be in the interest of simplification and space saving as well as reduction of weight desirable to have available a simpler device which does not require additional parts for the generation of the carrier frequency. It would also moreover be desirable if the mirror prism or mirror wheel having the described drawbacks, could be omitted in such a machine. It would be desirable, for reasons of costs, if such machine were adapted to cooperate with a receiver which is substantially similar to the known printer type machine.

In accordance with the invention, these desiderata are met by a facsimile transmitter provided with elements for the scanning of picture or image dots of lines extending transverse to the longitudinal extent of the record carrier, comprising means forming a stationary diaphragm element and a disklife rotatable element the journal and center point of which lies in the extended plane of the diaphragm, one of said elements being provided with a continuous slot and the other element with a row of alternately transparent and opaque parts formed of the material thereof, means for producing a constant white level, and means forming a short radially directed slot upon the rotatable disklike element for periodically scanning one of the two ends of the stationary diaphragm element, for producing phasing signals prior to the start of the transmission of a message contained on the record carrier.

In the photoelectrical scanning of picture or image copies for facsimile telegraphy, there is as a rule used a constant white level, which is produced with the aid of an auxiliary signal obtained by the scanning, and which is independent of the sensitivity fluctuations of the utilized light-sensitive elements (photocells; multiplier) and of the aging phenomena of the employed illumination lamp as well as independent of the different brightness shavings of the background of the copy. Since the auxiliary signal is to be present in the form of an alternating voltage, for better amplification control thereof and above all for its separation from the picture or image signal, it is necessary to generate in addition to a first carrier frequency for the picture signal, a second, different carrier frequency for the auxiliary signal. This requires additional expenditure, for example, in the form of a further modulation stage in which the auxiliary signal is modulated upon a second carrier produced by a further generator, or in the form of an auxiliary light chopper, for example, an auxiliary rotating perforated disk or a perforated disk with two concentric rows of different numbers of holes.

According to another object and feature of the present invention, there is provided a simpler device for the production of a constant white level, employing the scanning elements as such for the generation of the required second carrier frequency, from a circular area arranged on the rotating disklike scanning element concentrically to the axis thereof and consisting alternately of transparent and opaque equally long portions of the disk material, the average radius being such that the circularly extending apertures cover one of the two ends of the stationary diaphragm element, employing further an electrical frequency gate which is connected with the photocell arranged in back of the diaphragm element and the rotatable scanning disk, such photocell converting the scanned brightness values into proportional electrical currents, for the separation of the signals produced by the circularly arranged apertures, from the carrier frequency picture signals, having connected with an output of the frequency gate a regulation amplifier for the amplification of the picture signals, and a voltage source for supplying a fixed desired voltage, and a subtraction switching means, one control input of which is connected with the second output of the frequency gate, the second control input of which is connected with the voltage source and the output of which is connected with the regulation input of the regulation amplifier.

According to a further feature of the invention, another device for producing a constant white level comprises a regulation amplifier disposed in the picture channel, and a function switching means connected with the output as well as with the regulation input of the regulation amplifier, whereby the amplification of the picture signals to be transmitted is regulated depending upon the white-amplitudes obtained in the scanning of the white areas of the individual picture lines.

The facsimile transmitter according to the invention will now be described with reference to the embodiments shown in the accompanying drawings.

Figure 1:
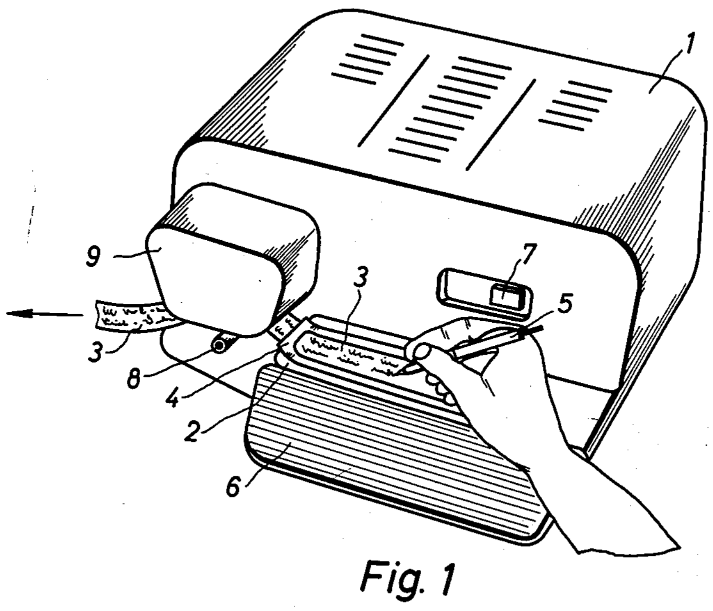
FIG. 1 shows the general design of the device.

Referring now to FIG. 1, numeral 1 indicates a housing containing the mechanical, optical and electrical parts of the facsimile transmitter, which is provided with a shelf 2 for the paper tape or strip 3 extending from a reel disposed in the housing and moving in the direction indicated by the arrow. The tape or strip 3 is held in position on the shelf 2 by a frame 4 forming a rectangular opening delimiting the area of the tape on which may be entered written matter, for example, by the use of a suitable pen or pencil 5, the supporting part 6 facilitating the writing which may be effected as desired, with the paper strip moving slowly or standing still. The button 7 serves for switching the device on whereupon the tape or strip 3 moves over the roller 8 in the direction of the arrow, with respect to a photoelectric scanning device contained in the casing 9, in which it is photoelectrically scanned in a manner to be presently explained.

Figure 2:
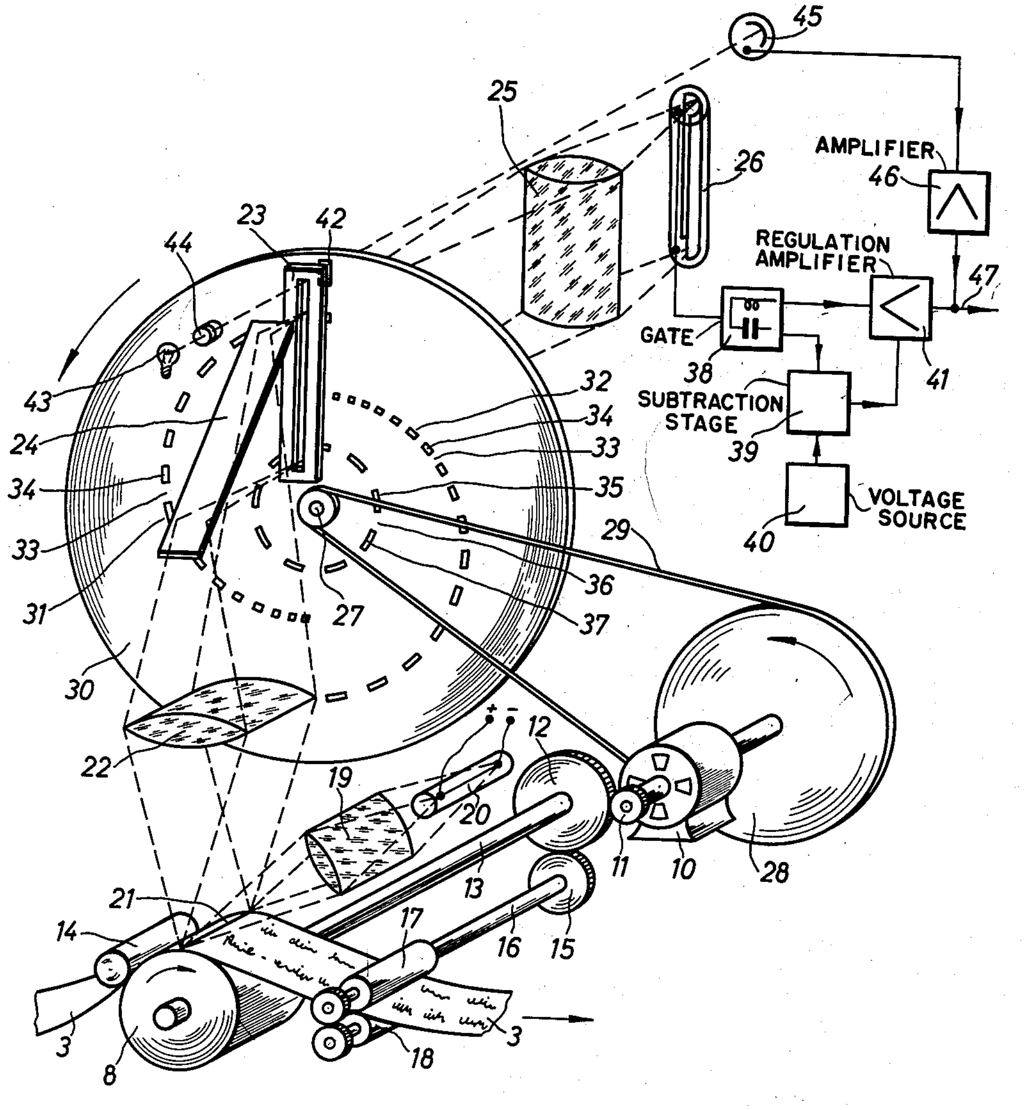
FIG. 2 illustrates an embodiment in which is produced an auxiliary signal for maintaining the white level constant.

Referring now to FIG. 2, the motor 10 drives over the gears 11 and 12 a shaft 13 and therewith the drum or roller 8 in the direction indicated by the arrow. The paper strip 3 which is approximately 35 millimeter wide and provided with notations to be transmitted, is pressed against the roller 8 by means of the roller 14 and is in the direction indicated by the arrow slowly transported by the rollers 17, 18 which are driven by the motor 10 through the medium of the gear 15 and the shaft 16. It is understood that the peripheral speeds of the roller 8 and of the transport rollers 17, 18 must be identical so as to prevent the tearing of the paper strip 3, such identical peripheral speeds being easily obtained by suitable dimensioning of the gearing and roller diameter, respectively. The image line 21 on the paper tape 3, which is to be scanned, is illuminated by light passing from the filament lamp 20 through the cylinder condenser 19. The diffused light reflected from the illuminated line 21 is collected by the cylinder lens 22, and the illuminated image line is thus pictured along the slot of the diaphragm element 23. The ray bundle leaving the cylinder lens 22 is for space saving reasons deflected by 90° by means of the mirror 24 and the image line passing through the slot of the diaphragm element 23 is through the medium of the cylinder lens 25 pictured upon the cathode of a cylindrical photocell 26 which releases fluctuating photo currents corresponding to the changing blackening of the writing on the record carrier. The light source 20 and the photocell 26 can exchange places in accordance with a known reciprocity law of optics without altering the optical effect.

The movable element of the scanning device comprises a disk-like member 30 which is disposed between the slotted diaphragm 23 and the cylinder lens 25, such element being rotatably journalled at 27 and driven by the motor 10 through the medium of the drive disk 28 and an endless drive member 29. The disk 30 is provided with two narrow arcuately or spirally extending rows of slots 31 and 32, which are mutually displaced by 180°, the slots being separated by webs 33. The lengths of the webs and the lengths of the punched out slot sections 34 are proportional for the respectively applying average radii of the respective spiral rows.

The punching out of the slot sections 34 can be omitted when making the disk 30 of glass or the like and blackening the intervening portions 33, thus leaving the sections 34 transparent.

In order to obtain with constant speed of revolution of the disk 30 constant light interruptions per unit of time, effected by the spiral slot rows 31 and 32, the lengths of the slot portions 33 and 34 must vary in view of the fact that the lengths of the spiral arc sections increase with increasing spiral radii, that is, the lengths of the slot portions 33 and 34 must increase with growing spiral radius.

The slot of the stationary diaphragm element 23, and therewith the image line projected therethrough, is responsive to rotation of the disk 30 by the two spiral slot rows 31 and 32 periodically scanned from the bottom to the top, since the scanning light is permitted to pass between the spiral slot portions and the stationary diaphragm slot only at the crossing point which moves along the stationary slot. The scanning light is thus by the arrangement of the spiral rows of slots periodically interrupted, thereby producing a carrier frequency.

In order to obtain, with constant speed of rotation $n$, constant speed of scanning of the image lines, that is, speed of motion of the crossing point between the spirally disposed slots and the stationary diaphragm slot, the spiral must be an archimedic spiral, since the spiral radius $r$ is in such spiral proportional to the spiral angle $\varphi$ which is with constant speed of revolution $n$ proportional to the time $t$:

$$r = a\varphi = 2\pi ant$$

($a$=proportionality factor).

Accordingly, $$\frac{dr}{dt} = 2\pi an = \text{const.}$$

that is, the scanning speed $$\frac{dr}{dt}$$

is constant at constant speed of revolution.

The slot portions of varying length are constructed along the spiral rows by dividing the disk into similar sectors $m$. The intersection lines of the sector radii with the spiral rows will give the lateral border lines for the slot portions of varying length.

It would, generally speaking, suffice to provide only one spiral row of slots starting at the level of the lower end of the range of the diaphragm slot required for the scanning of an image line and ending at the level of the upper end of this range. In such case, only one image line would be scanned per revolution of the disk, rotating with a speed $n$ per second, and the generated carrier frequency would amount to $f = \frac{1}{2}mn$. However, if a higher scanning speed is desired while maintaining the speed of revolution of the disk and the generated carrier frequency, it will be necessary to distribute the $m$ slot portions upon $p$ slot rows which are arranged mutually displaced by $360°/p$. In the illustrated example, $p=2$, and the spiral slot rows are mutually displaced by 180°, resulting in two scannings of the diaphragm slot per revolution of the disk. However, there are in the present case limits set with respect to a further increase of the number of spiral slot rows and therewith further increase of the scanning speed, since it shall be made possible to effect the writing on the paper tape, which is being moved depending upon the scanning speed, and since such tape must not move quicker than the hand of a writing person can move with respect to the moving record paper strip.

The slot of the diaphragm 23 is somewhat longer than an image line, leaving for the production of the white level a marginal portion of the record carrier which is free of writing. The light originating from this scanning and projecting through the slot falls upon a slotted circular area 35 on the disk 30, extending concentrically to the axis 27 thereof, this slotted or apertured circular area having alternate opaque and transparent portions 36 and 37 formed in the disk material. Accordingly, upon rotation of the disk 30, there will be produced a periodically interrupted light beam which falls upon the photocell 26 and produces at the output thereof a further carrier frequency. Since the number of slot-forming portions of the circular area 35 is different from the number $m$ of slot-forming portions of the spiral rows, the last noted carrier frequency will differ from the one which is obtained by the action of the slots of the spiral rows.

The carrier frequency image signal as well as the carrier frequency produced by the slots of the circular area 35 are conducted to an electrical gate 38, that is, a parallel circuit of a high pass filter and a low pass filter, in which the two frequencies are mutually separated. The amplitude of the carrier frequency produced by the circular slotted area 35 represents an auxiliary signal, that is, the actual value of the voltage of the white level, which is conducted to the subtraction stage 39 in which this actual voltage value is compared with a stabilized operating voltage value delivered from the voltage source 40, and in which a difference voltage is formed, in the event of lacking agreement between the two voltages, such difference voltage being conducted to the control input of the regulation amplifier 41 which amplifies the image signals. This arrangement secures a constant white level which is independent of sensitivity fluctuations of the photocell 26, as well as of aging behavior of the illumination lamp 20 and also of variations in the background brightness of the record paper strip 3.

For the phasing of the receiver with the facsimile transmitter of the present invention, it is necessary that a phasing signal be transmitted prior to starting the transmission of a written message. This is in space saving manner effected by the provision, in the rotating spiral row disk 30, of a radially directed, short, narrow slot or transparent portion 42 which sweeps periodically over one end of the slot of the diaphragm 23, thereby periodically freeing a light beam from the light source 43 which is by means of the condenser 44 trained toward the upper end of the diaphragm slot. Impulses are thereby produced at the output of the photocell 45, which are conducted over an amplifier 46 to the transmission line 47, such transmitted impulses being effective to cause the receiver to start operation from the correct initial position.

Figure 3:
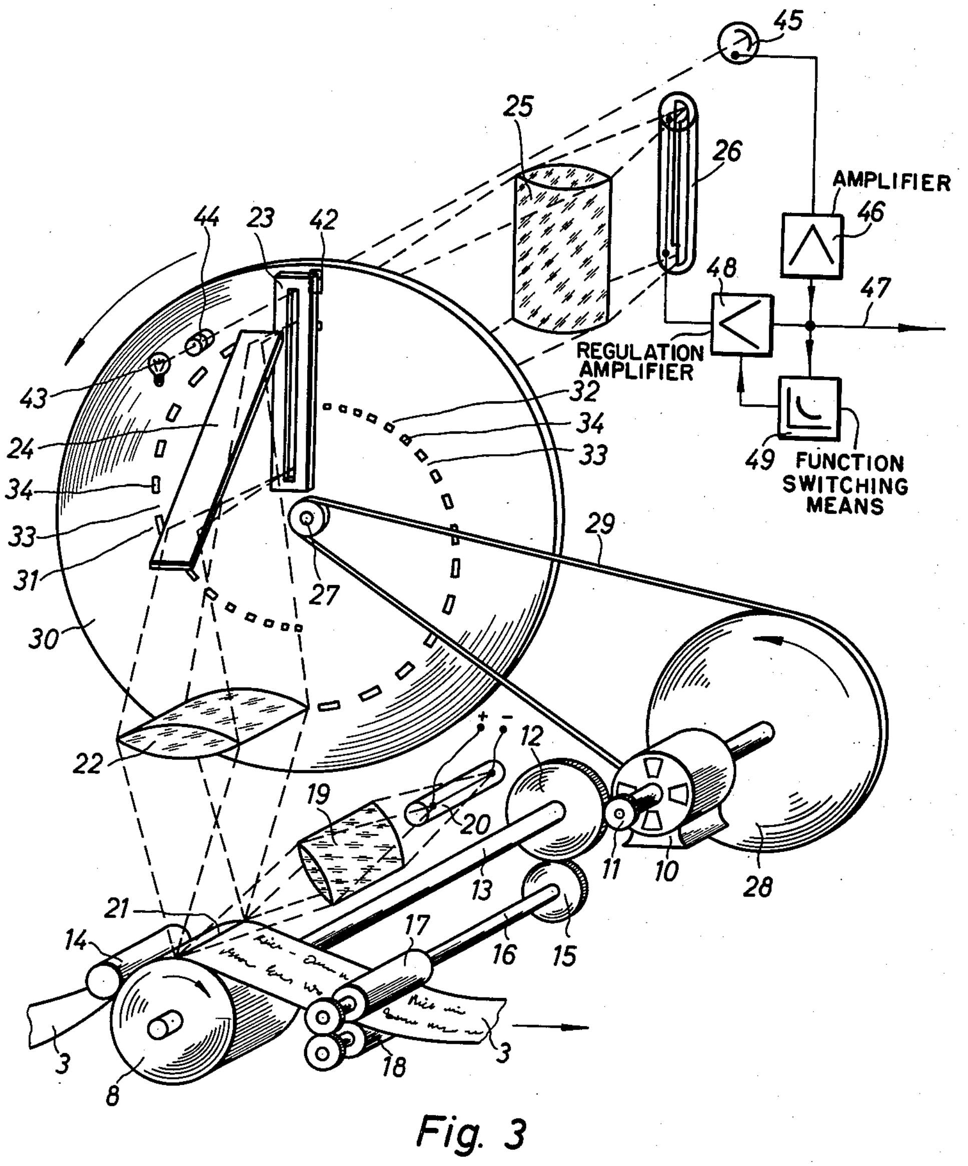
FIG. 3 represents an embodiment in which a signal for maintaining constant the white level, is obtained from the picture signal as such.

The embodiment shown in FIG. 3 differs from the one illustrated in FIG. 2 in that the white level is produced in somewhat different manner. The circular slotted area 35 employed in FIG. 2 for producing a second signal under consideration of the brightness of a marginal area of the record carrier 3 is omitted, and the brightness of the blank areas of the record carrier which remain between portions of written matter, is instead utilized for producing a constant white level. The virtue of this procedure is, that there will be embraced not only the fluctuating background brightness of a narrow marginal strip but the fluctuating background brightness of the entire record carrier, thereby making the production of the white level independent of fissures, shadow throwing folds and other brightness fluctuations which may possibly be present only in the marginal zone of the record carrier.

The constant white level is in this case produced by amplifying the carrier frequency image signal, the maximum amplitudes of which correspond to the white values of the paper extending between the image dots, in a regulation amplifier 48, whereupon the amplified signal is extended to the transmission line 47, while at the same time conducting the amplified signal to a function switching means 49 which produces the regulation voltages in accordance with a predetermined function of the signal amplitudes, such regulation voltages being conducted to the control input of the regulation amplifier 48. This feedback is effective, depending upon the background of the record carrier 3, to respectively reduce or increase a brightness exceeding a "normal white" or remaining below such normal brightness.

Figure 4:
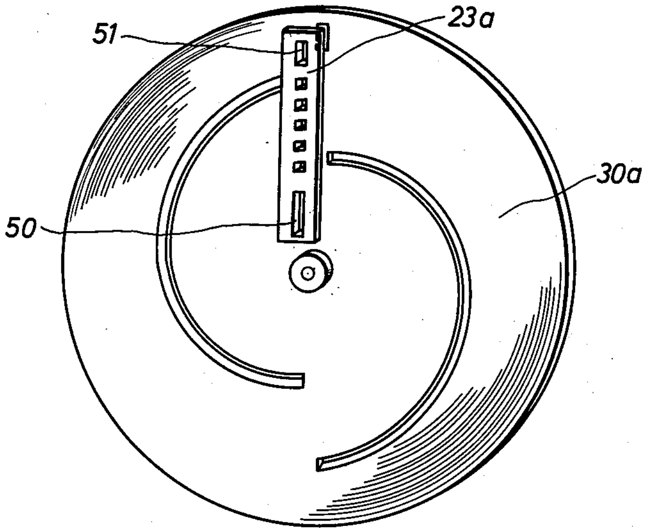
FIG. 4 shows a variant of the scanning elements.

FIG. 4 shows a modified embodiment of the scanning elements, wherein the stationary diaphragm is provided with slots for the line scanning, taking the place of the slot elements provided in the rotating spiral slot row disk of the previously described structures. This embodiment of the scanning device is a full equivalent for the scanning device employed in FIGS. 2 and 3, differing therefrom merely in that the member having the rows of slots is not movable but stationary. The diaphragm 23$a$ has slots or apertures provided therein which are formed alternately of transparent and opaque portions of the diaphragm material; the spiral slot disk 30$a$ is provided with continuous mutually displaced slots. The alternately transparent and opaque parts of the slots or apertures in the diaphragm 23$a$ are as compared with the slots or apertures of the spiral slot rows 31 and 32 (FIGS. 2 and 3), all of the same length. Since the spiral tangents of an archimedic spiral embrace with the associated spiral radii variable angles, which come with increasing spiral radius asymptotically near to the value 90°, the lateral border lines of the slot sections will not extend perpendicularly to the slots but embrace therewith varying angles smaller than 90°. At the upper and lower ends of the row of slots or apertures in the diaphragm 23$a$, where the scanning is respectively effected by the circular row 35 of slots and the slot 42, there are provided transparent portions 50 and 51.

Changes may be made within the scope and spirit of the appended claims which define what is believed to be new and desired to have protected by Letters Patent.

We claim:

1. In a facsimile transmitter for photoelectrically scanning and transmitting handwritten information provided upon a striplike record carrier, having a stationary apertured element for scanning image lines of a message extending transverse to the longitudinal extent of the record carrier, and having a rotatable apertured disklike scanning element for scanning cooperation with said stationary elemnet, the axis of said rotatable element intersecting the plane of the apertured stationary element, the combination wherein one of said scanning elements is provided with a continuous slot formed therein and the other element is provided with a row of alternately transparent and opaque portions formed therein from the material thereof, auxiliary means for producing a constant white level, and means including a relatively short radially directed slot formed in said rotatable scanning element for periodically scanning one of the two ends of the stationary diaphragm for the purpose of producing phasing signals to be transmitted prior to the start of transmission of a written message.

2. A facsimile transmitter according to claim 1, wherein said rotatable scanning element is provided with a spirally extending row of alternately transparent and opaque portions formed therein from the material thereof, the lengths of said portions being proportional to the respecitvely applicable average spiral radii.

3. A facsimile transmitter according to claim 1, wherein said stationary scanning element is provided with a row of alternately transparent and opaque portions of identical length, formed thereni from the material thereof.

4. A facsimile transmitter according to claim 1, comprising a device for producing a constant white level, said device comprising a circularly extending row of alternately transparent and opaque portions of identical length formed on said rotatable scanning element from the material thereof and extending concentrically to the axis thereof, the radius of said row being such that the active portions thereof sweep over one end of said stationary apertured scanning element incident to the rotation of said rotatable element, a photocell disposed in back of said stationary apertured scanning element which is operative to convert the scanned brightness values into proportional electric currents, an electrical frequency gate cooperatively connected with said photocell for separating the signals produced by said circularly extending row of alternately transparent and opaque portions from the signals produced by the carrier frequency image signals, a regulation amplifier connected with the output of said frequency gate for amplifying the image signals, a voltage source for delivering a fixed desired voltage, and subtraction means having a control input connected with a second output of said frequency gate and having a second control input connected with the voltage source, and having an output connected with the regulation input of the regulation amplifier.

5. A facsimile transmitter according to claim 1, comprising a device for producing a constant white level, said device comprising a regulation amplifier disposed in the image transmitting channel and function switching means connected respectively with the output and with the control input of the regulation amplifier, said function switching means being operative to regulate the amplification of the image signal which is to be transmitted depending upon white amplitudes obtained in the scanning of the white areas of the individual image lines.

References Cited in the file of this patent

UNITED STATES PATENTS 2,962,549 Fricks ------------------ Nov. 29, 1960

FOREIGN PATENTS 103,853 Australia -------------- Sept. 29, 1936